(12) United States Patent
Sawada et al.

(10) Patent No.: US 11,603,034 B2
(45) Date of Patent: Mar. 14, 2023

(54) VEHICLE LIGHTING APPARATUS

(71) Applicant: TOYOTA JIDOSHA KABUSHIKI KAISHA, Toyota (JP)

(72) Inventors: Tomonari Sawada, Nagoya (JP); Trenton Boyd Lindholm, Nagoya (JP); Arab Kroubi, Toyota (JP); Michael Shin Hong, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 3 days.

(21) Appl. No.: 17/009,105

(22) Filed: Sep. 1, 2020

(65) Prior Publication Data
US 2021/0061165 A1 Mar. 4, 2021

(30) Foreign Application Priority Data

Sep. 3, 2019 (JP) .............................. JP2019-160153

(51) Int. Cl.
| B60Q 1/14 | (2006.01) |
| B60Q 1/08 | (2006.01) |
| G06V 20/58 | (2022.01) |
| G06V 20/56 | (2022.01) |

(52) U.S. Cl.
CPC ............. B60Q 1/143 (2013.01); B60Q 1/085 (2013.01); G06V 20/584 (2022.01); G06V 20/588 (2022.01); B60Q 2300/056 (2013.01); B60Q 2300/42 (2013.01)

(58) Field of Classification Search
CPC .......... G06K 9/00798; G06K 9/00825; B60Q 1/143; B60Q 1/085; B60Q 2300/056; B60Q 2300/42
See application file for complete search history.

(56) References Cited

U.S. PATENT DOCUMENTS

| 6,459,387 | B1 | 10/2002 | Kobayashi et al. |
| 8,827,514 | B2* | 9/2014 | Takagaki ........... G06K 9/00825 362/466 |
| 9,481,292 | B2* | 11/2016 | Faber ....................... B60Q 1/08 |
| 9,789,809 | B2* | 10/2017 | Foltin ...................... B60Q 1/08 |
| 9,889,790 | B2* | 2/2018 | Liken ................... G06V 20/584 |
| 11,077,850 | B2* | 8/2021 | Green ............... B60W 60/0027 |
| 2013/0320193 | A1* | 12/2013 | Liken .................... H01L 27/146 250/208.1 |
| 2015/0016128 | A1 | 1/2015 | Doerne et al. |

FOREIGN PATENT DOCUMENTS

| JP | 2001-114012 A | 4/2001 |
| JP | 2016-083986 A | 5/2016 |

OTHER PUBLICATIONS

Translation of the patent document provided with the IDS of Sep. 1, 2020.*

* cited by examiner

Primary Examiner — Arman B Fallahkhair
(74) Attorney, Agent, or Firm — Sughrue Mion, PLLC (57) ABSTRACT

A lighting ECU determines whether or not a road sign relating to an urban area or a residential area is detected, while it is performing an automatic high beam control. When the detected road sign is a road sign indicating a start point of the urban area or of the residential area, the lighting ECU terminates the automatic high beam control, and maintain a light distribution pattern to a pattern corresponding to low beam. The lighting ECU restarts the automatic high beam control, when the detected road sign is a road sign indicating an end point of the urban area or of the residential area.

6 Claims, 7 Drawing Sheets

VEHICLE LIGHTING APPARATUS

TECHNICAL FIELD

The present disclosure relates to a vehicle lighting apparatus configured to be capable of controlling distribution of light from a lamp (or lamps).

BACKGROUND

There has been a known vehicle lighting apparatus. For example, one of the vehicle lighting apparatuses (hereinafter, referred to as a "conventional apparatus") proposed in Japanese Patent Application Laid-Open (kokai) No. 2016-83988 is configured to:
- obtain road information that corresponds to a current position of a host vehicle from map information; and
- control illumination intensity of headlamps based on the obtained road information.

More specifically, the conventional apparatus is configured to:
- determine whether or not the host vehicle is traveling in an urban area based on the obtained road information;
- set an illumination/lighting condition to a first condition when it is determined that the host vehicle is traveling in the urban area;
- set an illumination/lighting condition to a second condition when it is not determined that the host vehicle is traveling in the urban area; and
- control the headlamp units in accordance with the set condition.

The illumination intensity at both sides of an illumination range ahead of the host vehicle is greater when the headlamp units is controlled in accordance with the second condition than when the headlamp units is controlled in accordance with the first condition.

SUMMARY

As described above, the conventional apparatus determines whether or not the host vehicle is traveling in the urban area based on the road information contained in the map information. Hereinafter, this determination may be referred to as an "urban area determination". The urban area determination may be made based on the number of intersections included in a predetermined area around the host vehicle, and the number of roads that join a road (host vehicle traveling road) on which the host vehicle is traveling. Namely, the urban area determination may be made by determining whether or not the number of each of them is greater than respective thresholds. Therefore, if the road information is not accurate, the urban area determination is also not accurate.

Meanwhile, the urban area determination for controlling the headlamp units may be made based on various environmental parameters including brightness of an area ahead of the host vehicle, and an installation status of streetlights. The environmental parameters are acquired based on an image (or image data) of the area ahead of the host vehicle. The image is taken by an on-board camera. However, the brightness of the area ahead of the host vehicle may vary depending on time zone in which the host vehicle is traveling and on the installation status of the streetlights that may differ from region to region. Accordingly, the urban area determination made based on the environmental parameters may also not be accurate. If the distribution of light is controlled based on those inaccurate results of the urban area determination, there may be a case where the distribution of light is not desirable for a driver of the host vehicle. In other words, the driver may think such a control of the distribution of light is inconvenient/unuseful.

The present disclosure is achieved to solve the problem described above. One of objects of the present disclosure is to provide a vehicle lighting apparatus that is configured to be able to recognize a specific area (e.g., the urban area) accurately so as to appropriately perform a control of distribution of light in accordance with the specific area.

In order to achieve the above object, the vehicle lighting apparatus of the present disclosure comprises:
- a lamp unit (20L, 20R) configured to radiate light in a forward direction of a host vehicle;
- a camera device (30) configured to take a picture of a scene in front of (ahead of) the vehicle; and
- a control unit (10) configured to control distribution of light radiated from the lamp unit.

The control unit is configured to:
- obtain road sign information on a road sign posted ahead of the host vehicle based on the picture taken by the camera device;
- determine whether or not the host vehicle is traveling in a specific area based on the road sign information (S14); and
- control the distribution of light radiated from the lamp unit in such a manner that a light distribution pattern by the lamp unit matches a specific light distribution pattern for the specific area, when it is determined that the host vehicle is traveling in the specific area (S15, S25, S27).

In some embodiments, it can be said that the vehicle lighting apparatus of the present disclosure comprises:
- a head lamp unit (20L, 20R);
- light distribution control means (10) for controlling distribution of light of the head lamp unit;
- road sign information obtaining means (30) for taking a picture of a scene in front of a host vehicle to obtain road sign information on a road sign posted ahead of the host vehicle; and
- specific area determining/inferring means (S14) for determining/inferring whether or not the host vehicle is traveling in a specific area based on the road sign information obtained by the road sign information obtaining means.

Furthermore, the light distribution control means is configured to control the distribution of light radiated from the head lamp unit in such a manner that a light distribution pattern of the head lamp unit matches a specific light distribution pattern for the specific area, when it is determined that the host vehicle is traveling in the specific area (S15, S25, S27).

As described above, the control unit determines whether or not the host vehicle is traveling in the specific area based on the road sign information obtained through the camera unit.

In addition, the control unit controls the head lamp unit in such a manner that the actual light distribution pattern of the head lamp unit coincides with the specific light distribution pattern that are suitable for the specific area, when it is determined that the host vehicle is traveling in the specific area.

In this manner, the determination of whether or not the host vehicle is traveling in the specific area is made based on the road sign information obtained through the camera unit. Therefore, the specific area determination is accurate. Accordingly, the light distribution pattern can be appropriate when the host vehicle is traveling in the specific area so that the driver of the host vehicle can feel the great convenience.

In some embodiments, the control unit (or the specific area determining/inferring means) is configured to determine whether or not the road sign is a road sign indicating a start point of the specific area, and determine whether or not the road sign is a road sign indicating an end point of the specific area, to determine whether or not the host vehicle is traveling in the specific area.

In this manner, both the road sign representing/indicating the start point of the specific area and the road sign representing/indicating the end point of the specific area are used. Accordingly, the determination of whether or not the host vehicle is traveling in the specific area is made more properly.

In some embodiments, the specific area is any one of an urban area and a residential area. In this case, the control unit (or the specific area determining/inferring means) is configured to control the distribution of light radiated from the lamp unit in such a manner that the light distribution pattern by the lamp unit matches a pattern corresponding to low beam, or an intermediate light distribution pattern between a pattern corresponding to a high beam and the pattern corresponding to the low beam, in a period in which it is determined that the host vehicle is traveling in the specific area.

When the host vehicle is traveling in the urban area or the residential area, the light radiated from the lamp unit may frequently illuminate buildings including houses. For instance, when the host vehicle is traveling a curved road, there is a case where a building is present right in front of the host vehicle. If the light distribution pattern is set at the high beam pattern in such a case, the budding is lit with high intensity light. In some cases, that light streams into the building through a window. This may annoy a residence of that building, and thus, is not preferable.

In view of the above, in some embodiments, the specific area is defined as any one of the urban area and the residential area, as described above. In this case, it is preferable that the control unit be configured to determine whether or not the detected road sign is the road sign indicating the start point of the urban area or the residential area, and determine whether or not the detected road sign is a road sign indicating an end point of the urban area or the residential area.

In the period in which it is determined that the host vehicle is traveling in the specific area, the lamp unit is controlled so as to radiate light having the pattern according to the low beam or the pattern according to the intermediate light distribution pattern that is in-between the high beam and the low beam (i.e., the in-between pattern of high beam pattern and the low beam pattern).

In the above manner, whether or not the location (current position) of the host vehicle is within the urban area is accurately recognized based on the road sign, and whether or not the location (current position) of the host vehicle is within the residential is accurately recognized based on the road sign, Thus, the light distribution control that is appropriate for the recognized area can be carried out. In other words, the driver of the host vehicle does not have to pay a great attention to a circumstance of the host vehicle regarding the buildings and does not have to switch the light distribution pattern manually. In addition, annoying the residents in the urban areas or in the residential areas by the light from the lamp unit can be avoided.

Furthermore, the road signs representing (the start point and the end point of) the urban areas or the residential areas are posted based on needs for letting the driver recognize that the place in which the host vehicle is traveling is the urban area or the residential area. Accordingly, in some embodiments, the needs can be met.

In some embodiments, the control unit (or the light distribution control means) is configured to:

perform an automatic high beam control that is a control to automatically switch, in response to a state of an area ahead of the host vehicle, the light distribution pattern by the lamp unit between the pattern corresponding to the low beam and the pattern corresponding to the high beam (S16); and maintain the light distribution pattern by the lamp unit at the pattern corresponding to the low beam regardless of the state of the area ahead of the host vehicle in place of the automatic high beam control, in a period in which it is determined that the host vehicle is traveling in the specific area after it is determined that the host vehicle starts traveling in the specific area while the automatic high beam control is being performed (S15).

In some embodiments, it can be said that the light distribution control means includes automatic high beam control means (S16), and specific area light distribution adjusting control means for maintaining the light distribution pattern by the lamp unit at the pattern corresponding to the low beam as described above (S15).

The light distribution control means is configured to perform the automatic high beam control for performing the automatic high beam control to automatically switch, in response to a state of an area ahead of the host vehicle, the light distribution pattern by the lamp unit between the high beam (i.e., the high beam pattern that is the pattern corresponding to the high beam) and the low beam (i.e., the low beam pattern that is the pattern corresponding to the low beam). For instance, the control unit (the light distribution control means) may preferably switch between the high beam pattern and the low beam pattern, based on the determination as to whether or not at least the other vehicle with its lights on (the preceding vehicle with its lights on and/or the oncoming vehicle with its lights on) has been detected.

The specific area light distribution adjusting control means is configured to maintain the fight distribution pattern by the lamp unit at the pattern corresponding to the low beam regardless of the state of the area ahead of the host vehicle in place of the automatic high beam control, in the period in which it is determined that the host vehicle is traveling in the specific area after it is determined that the host vehicle starts traveling in the specific area while the automatic high beam control is being performed.

Accordingly, in the period in which it is determined that the host vehicle is traveling in the specific area (e.g., at least one of the urban area and the residential area), the light distribution pattern by the lamp unit is, irrespective of the state of the area ahead of the host vehicle, maintained at the low beam pattern, which is appropriate for the specific are.

In some embodiments, the lamp unit is configured to be capable of darkening high beam obtained under the high beam pattern.

The control unit (or the light distribution control means) is configured to:

perform an adaptive high beam control that is a control to darken the high beam obtained under the high beam pattern in response to a state of an area ahead of the host vehicle (S26); and maintain the light distribution pattern by the lamp unit at either the pattern corresponding to the low beam, or an intermediate light distribution pattern between the pattern corresponding to the low beam and the pattern corresponding to the high beam, regardless of the state of the area ahead of the host vehicle host vehicle, in place of the adaptive high beam control, in a period in which it is determined that the host vehicle is traveling in the specific area after it is determined that the host vehicle starts traveling in the specific area while the adaptive high beam control is being performed (S25).

In some embodiments, it can be said that the light distribution control means includes adaptive high beam control means and specific area light distribution adjusting control means. The adaptive high beam control means is configured to perform the adaptive high beam control to darken the high beam in response to the state of the area ahead of the host vehicle. For instance, at least when the other vehicle with its lights on (the preceding vehicle with its lights on and/or the oncoming vehicle with its lights on) has been detected, the control unit (the light distribution control means) may preferably control the light distribution of the high beam, based on the position of the other vehicle with its lights on, in such a manner that a luminescence (an amount of light) that irradiates the position of the other vehicle is decreased. Decreasing the luminescence (the amount of light) from the lamp unit may be implemented by reducing the amount of light of the light source of the lamp unit, or by shielding (shading/blocking) the light radiated from the lamp unit.

When it is determined that the host vehicle is traveling in the specific area while the adaptive high beam control is being performed, the specific area light distribution adjusting control means is configured to terminate the adaptive high beam control and to maintain the light distribution pattern by the lamp unit at either the pattern corresponding to the low beam pattern or the intermediate light distribution pattern (in terms of the irradiance).

Accordingly, in the period in which it is determined that the host vehicle is traveling in the specific area (e.g., at least one of the urban area and the residential area), the light distribution pattern by the lamp unit is, irrespective of the state of the area ahead of the host vehicle, maintained at the low beam pattern which is appropriate for the specific area or at the intermediate light distribution pattern in terms of the irradiance which is also appropriate for the specific area.

In some embodiments, the lamp unit is configured to be capable of darkening high beam obtained under the high beam pattern.

The control unit (or the light distribution control means) is configured to:
  perform an adaptive high beam control that is a control to darken the high beam in response to a state of an area ahead of the host vehicle (S26); and
  set the light distribution pattern by the lamp unit to an intermediate light distribution pattern as a standard light distribution pattern, the intermediate light distribution pattern being between the pattern corresponding to the low beam and the pattern corresponding to the high beam, and to (further) darken high beam obtained under the standard light distribution pattern in response to the state of the area ahead of the host vehicle, in place of the adaptive high beam control, in a period in which it is determined that the host vehicle is traveling in the specific area after it is determined that the host vehicle starts traveling in the specific area while the adaptive high beam control is being performed (S27).

In some embodiments, it can be said that the light distribution control means includes adaptive high beam control means and specific area light distribution adjusting control means. The adaptive high beam control means is configured to perform the adaptive high beam control to darken the high beam in response to the state of the area ahead of the host vehicle. For instance, at least when the other vehicle with its lights on (the preceding vehicle with its lights on and/or the oncoming vehicle with its lights on) has been detected, the control unit (the light distribution control means) may preferably control the light distribution of the high beam, based on the position of the other vehicle with its lights on, in such a manner that a luminescence (an amount of light) that irradiates the position of the other vehicle is decreased. Decreasing the luminescence (the amount of light) from the lamp unit may be implemented by reducing the amount of light of the light source of the lamp unit, or by shielding (shading/blocking) the light radiated from the lamp unit.

When it is determined that the host vehicle is traveling in the specific area while the adaptive high beam control is being performed, the specific area light distribution adjusting control means is configured to set the light distribution pattern by the lamp unit to the intermediate light distribution pattern as the standard light distribution pattern, the intermediate light distribution pattern being between the pattern corresponding to the low beam and the pattern corresponding to the high beam, and to (further) darken high beam obtained under the standard light distribution pattern in response to the state of the area ahead of the host vehicle, in place of the adaptive high beam control, in the period in which it is determined that the host vehicle is traveling in the specific area.

Accordingly, in the period in which it is determined that the host vehicle is traveling in the specific area (e.g., at least one of the urban area and the residential area), the light distribution pattern by the lamp unit becomes appropriate for the specific area and the state of the area ahead of the host vehicle.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the present disclosure are not limited to those in the embodiments defined by the names and/or the symbols.

DETAILED DESCRIPTION

Vehicle lighting apparatuses according to embodiments of the present disclosure will be described with reference to the drawings.

First Embodiment

Figure 1:
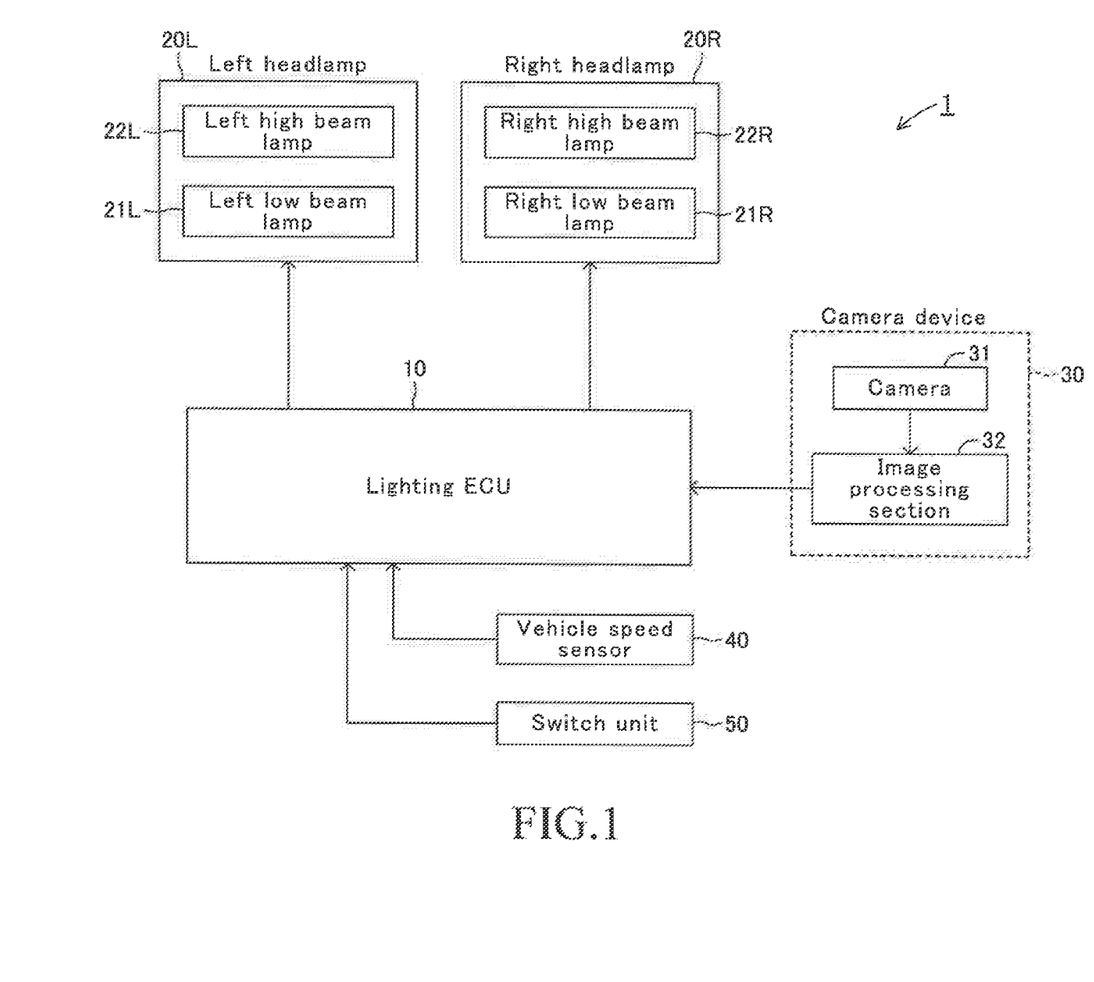
FIG. 1 is a schematic diagram of a vehicle lighting apparatus according to a first embodiment of the present disclosure.

FIG. 1 is a schematic diagram of a vehicle lighting apparatus 1 according to a first embodiment of the present disclosure. The vehicle lighting apparatus 1 is installed on a vehicle that is sometimes referred to as a "host vehicle" to be distinguished from another vehicles. The vehicle lighting apparatus 1 comprises a lighting ECU 10, a left headlamp (a left headlamp unit) 20L, a right headlamp (a right headlamp unit) 20R, a camera device 30, a vehicle speed sensor 40, and a switch unit 50.

An "ECU" is an abbreviation of an Electronic Control Unit and is a controller of the vehicle lighting apparatus 1. The lighting ECU 10 comprises, as a main component, a microcomputer that includes a CPU, a ROM, a RAM, a nonvolatile memory, and an interface I/F. The CPU achieves various functions described later through executing instructions (i.e., programs/routines) stored in the memory (ROM).

The left headlamp 20L, is placed/arranged at a front left end of the host vehicle. The right headlamp 20R is placed/arranged at a front right end of the host vehicle. The left headlamp 20L and the right headlamp 20R are symmetrically arranged, and have the substantially same configuration as each other. The left headlamp 20L comprises a left low beam lamp 21L and a left high beam lamp 22L. The right headlamp 20R comprises a right low beam lamp 21R and a right high beam lamp 22R.

Hereinafter, when the left headlamp 20L and the right headlamp 20R need not to be distinguished from each other, each of them may be referred to as a "headlamp 20". Similarly, when the left low beam lamp 21L and the right low beam lamp 21R need not to be distinguished from each other, each of them may be referred to as a "low beam lamp 21". In addition, when the left high beam lamp 22L and the right high beam lamp 22R need not to be distinguished from each other, each of them may be referred to as a "high beam lamp 22". The low beam lamp 21 illuminates/irradiates a low beam area (or a low beam range) that is an area relatively close to the host vehicle in a forward direction of the host vehicle. The high beam lamp 22 illuminates/irradiates a high beam area (or a high beam range) that is an area relatively far away from the host vehicle in the forward direction of the host vehicle. The low beam lamp 21 and the high beam lamp 22 are connected to the lighting ECU 10 and are controlled by the lighting ECU 10.

The camera device 30 is arranged at a part of a front windshield and inside an cabin of the host vehicle, and is configured to take/capture a picture (image data) of a scene in front of (or ahead of) the host vehicle through the front windshield from the cabin. More specifically, the camera device 30 comprises a camera 31 and an image processing section 32. The camera 31 is configured to take/capture the picture of the scene in front of (or ahead of) the host vehicle to obtain image data (of the scene). The camera 31 is configured to transmit the image data to the image processing section 32. The image processing section 32 is configured to recognize/detect, based on the image data, taillights of a preceding vehicle and headlights of an oncoming vehicle, so as to recognize/detect the preceding vehicles with their lights on (i.e., a preceding vehicle whose taillights are being on) and an oncoming vehicle with its lights on (i.e., an oncoming vehicle whose headlights are being on). The image processing section 32 is configured to transmit, to the lighting ECU 10, information (hereinafter, referred to as other vehicle information) regarding the preceding vehicle with its lights on and the oncoming vehicle with its lights on, every time a predetermined time elapses. The other vehicle information includes: information representing whether or not each of the preceding vehicle with its lights on and the oncoming vehicle with its lights on is present; and positional information indicative of a position of each of the preceding vehicle with its lights on and the oncoming vehicle with its lights on with respect to the host vehicle.

The image processing section 32 is configured to recognize/detect brightness of the area ahead of the host vehicle based on the image data from the camera 31 so as to obtain information (hereinafter, referred to as "brightness information") regarding the brightness of the area ahead of the host vehicle, and to transmit the brightness information to the lighting ECU 10, every time a predetermined time elapses.

In addition, the image processing section 32 is configured to recognize/detect road sign(s) posted in the area ahead of the host vehicle based on the image data from the camera 31. The image processing section 32 is configured to determine whether or not the recognized road sign indicates a start point (start) of a specific area, and whether or not the recognized road sign indicates an end point (end) of a specific area. The specific area includes an urban area and a residential area. The specific are is (regarded as an area) between a position of the road sign indicating the start point of the specific area and a position of the road sign indicating the end point of the specific area.

Figure 2:
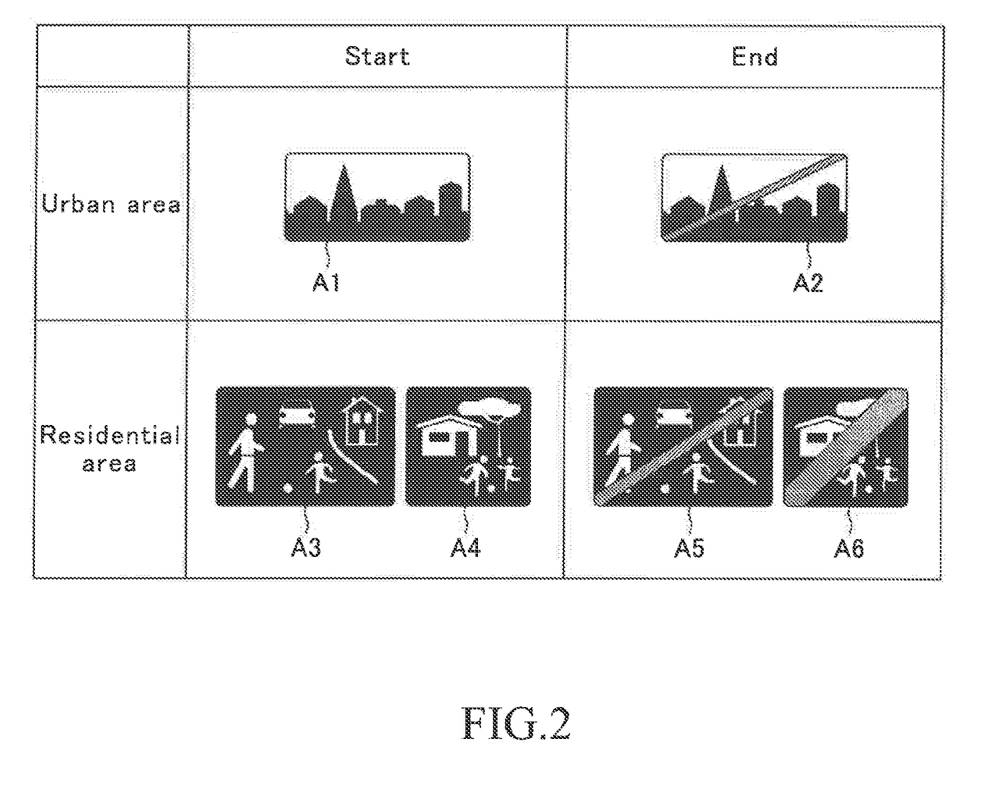
FIG. 2 is a front view of each road sign representing a start point or an end point of a specific area.

FIG. 2 shows road signs relating to the urban area and the residential area. The road sign A1 represents the start point of the urban area, Namely, the road sign A1 indicates that the urban area starts from a position at which the road signal A1 is provided. The road sign A2 represents the end point of the urban area. Namely, the road sign A2 indicates that the urban area ends at a position at which the road signs A2 is provided. Each of the road sign A3 and the road sign A4 represents the start point of the residential area. Namely, each of the road sign A3 and the road sign A4 indicates that the residential area starts from a position at which each of them is provided. Each of the road sign A5 and the road sign A6 represents the end point of the residential area. Namely, each of the road sign A5 and the road sign A6 indicates that the residential area ends at a position at which each of them is provided.

The image processing section 32 have stored those road signs in advance through, for example, a machine learning. The image processing section 32 is configured to use, for example, a pattern matching method so as to recognize at least the road signs relating to the specific area among various road signs, based on the image data from the camera 31 to obtain information relating to the road signs. The information relating to the road signs is referred to as "road sign information". The image processing section 32 is configured to transmit the road sign information to the lighting ECU 10, every time a predetermined time elapses. The road sign information includes: information representing whether or not the road sign is recognized/detected; and information (meaning) represented by the recognized road sign.

The vehicle speed sensor 40 is configured to detect/measure a vehicle speed (speed of a vehicle body of the host vehicle), and to transmit a vehicle speed signal indicative of the detected vehicle speed to the lighting ECU 10, every time a predetermined time elapses.

The switch unit 50 includes:
an On/Off light switch for switching between on and off of the headlamp 20;
an Hi/Lo switch for selecting a light distribution pattern of the headlamp 20 (i.e., for selecting either a light distribution pattern for high beam or a light distribution pattern for low beam);
an automatic high beam control selecting switch for selecting whether to perform/execute an automatic high beam control; and
a specific area light distribution selecting switch for selecting whether to perform/execute a specific area light distribution adjusting/switching control.

The switch unit 50 is configured to transmit "information indicative of a set state selected/determined by the driver's operation to the switch unit 50" to the lighting ECU 10, every time a predetermined time elapses. It should be noted that the switches described above are not necessarily provided to the switch unit 50 integrally. In other words, one or more of the switches described above may be disposed separately from each other. Furthermore, one or more of the switches described above may be realized by an unillustrated touch panel. In addition, the On/Off light switch may be replaced with an automatic switching switch that utilizes signal from an unillustrated brightness sensor configured to detect brightness of an area around the host vehicle.

A light distribution control performed by the lighting ECU 10 will next be described. The ECU 10 carries out the automatic high beam control, when an execution of the automatic high beam control is selected by the automatic high beam control selecting switch. Furthermore, the ECU 10 carries out the specific area light distribution adjusting control in parallel with the automatic high beam control, when an execution of the specific area light distribution adjusting control is selected by the specific area light distribution selecting switch.

The automatic high beam control employed in the present embodiment is generally known as an "AHB (Automatic High Beam)" that is a control to automatically switch/change the light distribution pattern when the headlamp 20 is lighted (on). While the lighting ECU 10 is performing the automatic high beam control, the lighting ECU 10 automatically switches the light distribution pattern between the low beam (or the light distribution pattern for low beam, referred to as a "low beam pattern") and the high beam (or the light distribution pattern for high beam, referred to as a "high beam pattern") based on the vehicle speed detected by the vehicle speed sensor 40 and the information (e.g., the other vehicle information and the brightness information) transmitted from the camera device 30.

When the light distribution pattern is set to the high beam pattern, both of the high beam lamp 22 and the low beam lamp 21 are lighted (on). Whereas, when the light distribution pattern is set to the low beam pattern, the high beam lamp 22 is not lighted (is off) and only the low beam lamp 21 is lighted (on). In this manner, while the headlamp 20 is on, the low beam lamp 21 is always on (lighted). Thus, while the lighting ECU 10 is performing the automatic high beam control, the lighting ECU 10 controls the state (on/off state) of the high beam lamp 22.

Conditions for switching the light distribution pattern between the high beam pattern and the low beam pattern includes a high beam condition and a low beam condition. The high beam condition is satisfied when all of the following conditions are satisfied.

The vehicle speed is equal to or higher than a predetermined vehicle speed threshold (i.e., first speed threshold, e.g., 30 km/h).

The brightness of the area in front of the host vehicle is less than a predetermined (first) reference brightness (in other words, the area is determined to be dark).

No other vehicle (the preceding vehicle and the oncoming vehicle) with its lights on is not determined to be present.

The low beam condition is satisfied when the high beam condition is not satisfied. It should be noted that the above listed conditions for satisfying the high beam condition are mere examples. The conditions for satisfying the high beam condition may be different from the above examples.

When the high beam condition is satisfied, the lighting ECU 10 turns on the high beam lamp 22. Namely, when the high beam condition is satisfied, the light distribution pattern is set to the high beam pattern. When the low beam condition is satisfied (the high beam condition is not satisfied), the lighting ECU 10 turns off the high beam lamp 22, Namely, when the low beam condition is satisfied, the light distribution pattern is set to the low beam pattern.

The specific area light distribution adjusting control will next be described. The specific area light distribution adjusting control is a control to maintain the light distribution pattern at the low beam pattern regardless of a state ahead of the host vehicle by terminating the automatic high beam control in a period in which it is determined/inferred that the host vehicle is traveling in the specific area, after it is determined/inferred that the host vehicle has started traveling in the specific area while the automatic high beam control has been being executed.

Figure 3:
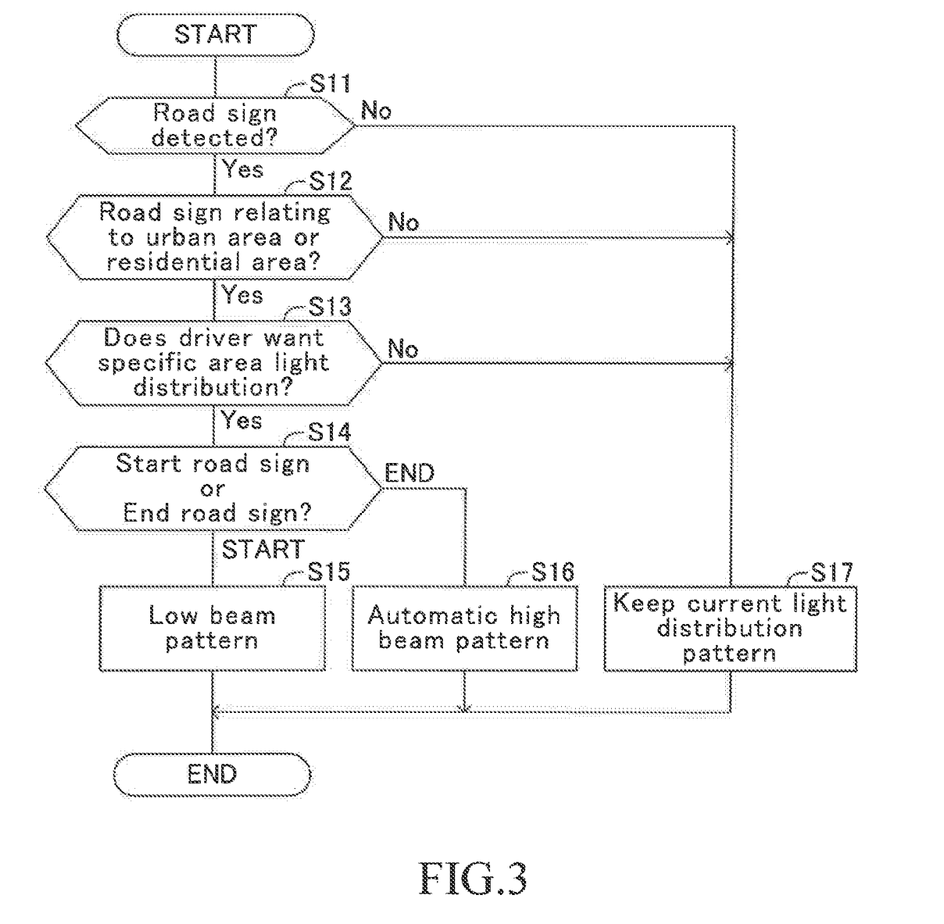
FIG. 3 is a flowchart representing a specific area light distribution adjusting (switching) control routine according to the first embodiment.

FIG. 3 shows a flowchart representing a specific area light distribution adjusting control routine. The lighting ECU 10 is configured to execute the specific area light distribution adjusting control routine every time a predetermined time elapses. Hereinafter, the specific area light distribution adjusting control routine may simply be referred to as an adjusting control routine (or switching control routine).

When and after the adjusting control routine is started, the lighting ECU 10 firstly determines whether or not a road sign is detected at step S11. In this case, the lighting ECU 10 makes this determination based on the road sign information transmitted from the camera device 30. When the lighting ECU 10 determines that no road sign is detected (S11: No), the lighting ECU 10 proceeds to step S17. At step S17, the lighting ECU 10 controls the headlamp 20 to maintain the current light distribution pattern. Immediately after the adjusting control routine is started, the light distribution pattern according to automatic high beam control is selected and achieved.

When the lighting ECU 10 determines that the road sign is detected (S11: Yes) while it is executing the adjusting control routine repeatedly, the lighting ECU 10 proceeds to step S12. At step S12, the lighting ECU 10 determines whether or not the detected road sign is a road sign relating to the urban area, and determines whether or not the detected road sign is a road sign relating to the residential area. When the lighting ECU 10 determines that the detected road sign is neither the road sign relating to the urban area nor the road sign relating to the residential area, the lighting ECU 10 proceeds to step S17 so as to control the headlamp 20 to maintain the current light distribution pattern.

Whereas, when the lighting ECU 10 determines that the detected road sign is either the road sign relating to the urban area or the road sign relating to the residential area, the lighting ECU 10 proceeds to step S13. At step S13, the lighting ECU 10 determines whether or not the driver has been wanting/selecting the specific area light distribution adjusting control. It should be noted that the driver turns on the specific area light distribution selecting switch that is arranged in the switch unit 50, when the driver wants the execution of the specific area light distribution adjusting control. Therefore, at step S13, the lighting ECU 10 determines whether or not the specific area light distribution selecting switch is on.

When the specific area light distribution selecting switch is (has been) off (S13: No), the lighting ECU 10 proceeds to step S17 so as to control the headlamp 20 to maintain the current light distribution pattern.

Whereas, when the specific area light distribution selecting switch is (has been) on (S13: Yes), the lighting ECU 10 proceeds to step S14. At step 14, the lighting ECU 10 determines whether or not the detected road sign is either one of the "road sign representing/indicating the start point of the urban area" and the "road sign that represents the start point of the residential area". Hereinafter, the road sign that represents the start point of the urban area or the start point of the residential area may be collectively referred to as a start point road sign (or start road sign). In addition, at step S14, the lighting ECU 10 determines whether or not the detected road sign is either one of the road sign representing/indicating the end point of the urban area and the road sign representing/indicating the end point of the residential area. Hereinafter, the road sign that represents the end point of the urban area or the end point of the residential area may be collectively referred to as an end point road sign (or end road sign).

When lighting ECU 10 determines that the detected road sign is the start point road sign, the lighting ECU 10 proceeds to step S15. At step S15, the lighting ECU 10 sets the light distribution pattern to the low beam pattern. Namely, the lighting ECU 10 turns off the high beam lamp 22, and keeps the low beam lamp 21 on (lighted).

In this manner, when the host vehicle enters the urban area or the residential area (or the host vehicle is about to pass through the start point road sign), the light distribution pattern is fixed to the low beam pattern. This can make the light distribution pattern appropriate to the urban area or the residential area.

When the lighting ECU 10 determines that the end point road sign is detected at step S14 while the lighting ECU 10 is repeating the adjusting control routine every time the predetermined time elapses, the lighting ECU 10 proceeds to step S16. At step S16, the lighting ECU 10 switches the light distribution pattern to the automatic high beam pattern that is the light distribution pattern according to the automatic high beam control. Therefore, when the host vehicle leaves (gets out of) the urban area or the residential area, the lighting ECU 10 ends the control using only the low beam lamp 21 and starts (restarts) the automatic high beam control.

The thus configured vehicle lighting apparatus 1 of the first embodiment determines/infers whether or not the host vehicle is traveling in the urban area or the residential area based on the road signs. Thus, the vehicle lighting apparatus 1 can make the determination (specific area determination) properly/accurately so as to provide the light distribution that is appropriate for the urban area and the residential area. Accordingly, the driver does not have to change the light distribution pattern by himself/herself by paying attention to the scenes around the host vehicle. Therefore, the driver can feel the great convenience. Furthermore, the vehicle lighting apparatus 1 can avoid annoying the residents in the urban areas or in the residential areas by the light from the headlamp 20.

Furthermore, the road signs representing the urban areas or the residential areas are posted based on needs for letting the driver recognize that the place in which the host vehicle is traveling is the urban area or the residential area. Accordingly, the vehicle lighting apparatus 1 can meet the needs.

Furthermore, the vehicle lighting apparatus 1 allows the driver to use the specific area light distribution selecting switch to determine/select whether to automatically switch the light distribution pattern in the specific area to the "light distribution pattern according to the specific area light distribution adjusting control". The light distribution pattern according to the specific area light distribution adjusting control may be referred to as the "specific area light distribution pattern". Therefore, the vehicle lighting apparatus 1 can perform the light distribution control that meets the driver's requirement/expectation.

Second Embodiment

A vehicle lighting apparatus according to a second embodiment of the present disclosure will next be described. The vehicle lighting apparatus according to the second embodiment employs an Adaptive High Beam System that is referred to as an AHS. The AHS is a system that is capable of darkening the high beam (i.e., reducing the amount of light from the high beam lamp) so as to adjust the light distribution pattern.

Figure 4:
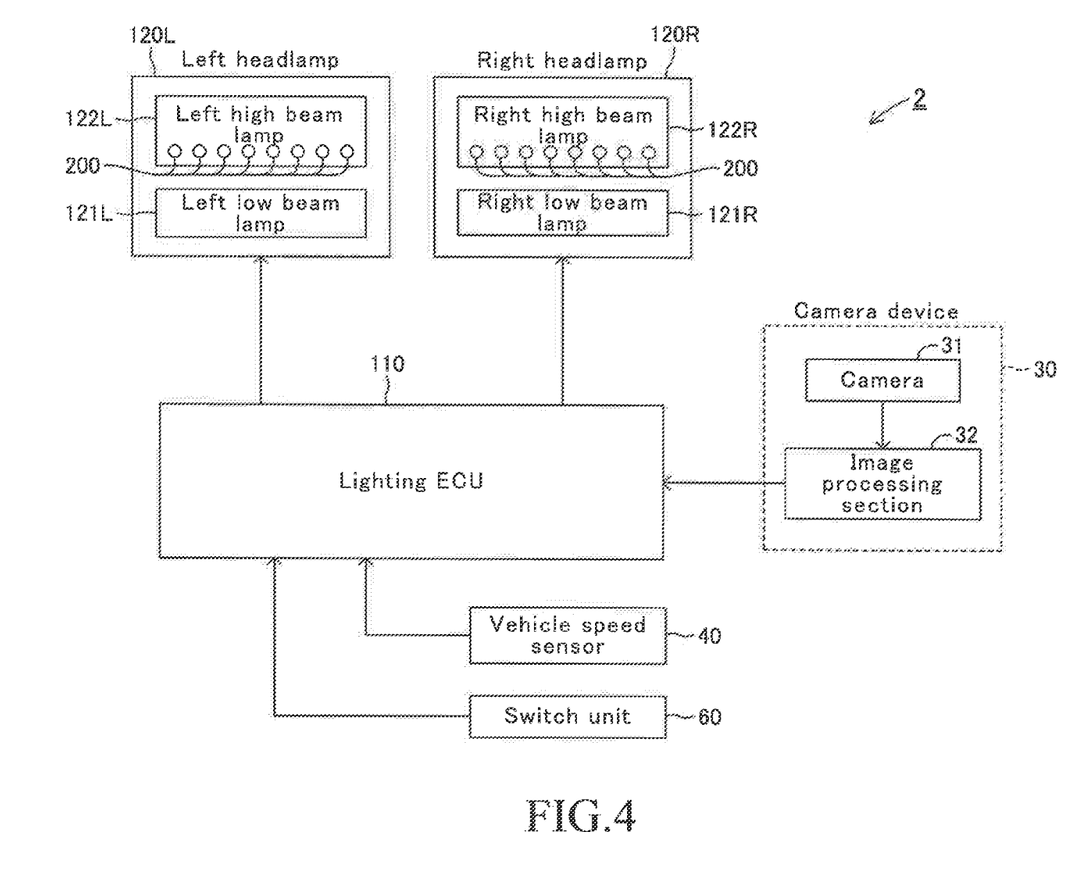
FIG. 4 is a schematic diagram of a vehicle lighting apparatus according to a second embodiment of the present disclosure.

FIG. 4 is a schematic diagram of a vehicle lighting apparatus 2 according to the second embodiment of the present disclosure. The vehicle lighting apparatus 2 comprises a lighting ECU 110, a left headlamp (left headlamp unit) 120L, a right headlamp (right headlamp unit) 120R, the camera device 30, the vehicle speed sensor 40, and a switch unit 60. It should be noted that a constituent that is the same as the constituent of the first embodiment is given a reference symbol of that of the first embodiment, and the description thereof may be omitted.

The left headlamp 120L and the right headlamp 120R are lamps for the AHS, and are placed/arranged at the front left end of the host vehicle and the front right end of the host vehicle, respectively, in such a manner that they are symmetrically arranged. The left headlamp 120L and the right headlamp 120R have the substantially same configuration as each other. The left headlamp 120L comprises a left low beam lamp 121L and a left high beam lamp 122L. The right headlamp 120R comprises a right low beam lamp 121R and a right high beam lamp 122R. Hereinafter, when the left headlamp 120L and the right headlamp 120R need not to be distinguished from each other, each of them may be referred to as a "headlamp 120". Similarly, when the left low beam lamp 121L and the right low beam lamp 121R need not to be distinguished from each other, each of them may be referred to as a "low beam lamp 121". In addition, when the left high beam lamp 122L and the right high beam lamp 122R need not to be distinguished from each other, each of them may be referred to as a "high beam lamp 122". The low beam lamp 121 and the high beam lamp 122 are connected to the lighting ECU 110, and are controlled by the lighting ECU 110.

In the headlamp 120, among the low beam lamp 121 and the high beam lamp 122, only the high beam lamp 122 is configured to be light distribution controllable. A light distribution property of the low beam lamp 121 is unchangeable, and thus, the low beam lamp 21 used in the first embodiment may be used for the low beam lamp 121.

The high beam lamp 122 includes a plurality of LED light sources (i.e., light-emitting diodes) 200. The LED light sources 200 are arranged along a lateral/horizontal direction (in a single row). It should be noted that the arrangements of the LED light sources 200 in the high beam lamp 122 are arbitrary. For example, the LED light sources may be arranged in two rows, wherein the LED light sources in each row are arranged along a lateral/horizontal direction. In addition, the number of the LED light sources for the high beam lamp 122 is also arbitrary. Hereinafter, the LED light source 200 may simply be referred to as an LED 200.

The lighting ECU 110 is different from the lighting ECU 10 only in the following points.

The lighting ECU 110 has a function of controlling the light distribution of the high beam lamp 122.

The lighting ECU 110 decreases a luminescence (an amount of light) from the high beam lamp 122 when it is determined/inferred that the host vehicle is traveling in the specific area.

A plurality of the LEDs 200 of the high beam lamp 122 are connected to the lighting ECU 110 independently from each other. The lighting ECU 110 can selectively light the LEDs 200. Namely, the LEDs 200 can be turned on/off independently from each other by the lighting ECU 110. Furthermore, a current flowing through each of the LEDs 200 is controlled by the lighting ECU 110 independently, so that luminescence (an amount of light) from each of the LEDs 200 can be independently controlled. Directions of irradiation of the LEDs 200 are different from each other. The direction of irradiation of each of the LEDs 200 has been fixed in advance. When all of the LEDs 200 are turned on (lighted), a predetermined entire illumination area (range) of the high beam lamp 122 is illuminated. In other words, when only one of the LEDs 200 is lighted, only an illumination area (only a part of the entire illumination area) corresponding to that lighted LED 200 is illuminated. Moreover, by controlling currents flowing through all of the LEDs 200, an irradiance of the entire illumination area is adjusted (increased and decreased). In addition, while the irradiance of the entire illumination area is being decreased, an irradiance of an arbitrary illumination area (i.e., only a part of the entire illumination area of the high beam lamp 122) can further be decreased.

The switch unit 60 is different from the switch unit 50 of the first embodiment only in that the switch unit 60 further includes an adaptive high beam control selection switch. The adaptive high beam control selection switch is used for selecting whether to perform an adaptive high beam control. When the execution of the adaptive high beam control is selected using the adaptive high beam control selection switch, the execution of the automatic high beam control cannot be selected using the automatic high beam control selecting switch.

A light distribution control performed by the lighting ECU 110 will next be described. When the execution of the automatic high beam control is being selected using the automatic high beam control selecting switch, the lighting ECU 110 carries out the automatic high beam control. The automatic high beam control is the same as the automatic high beam control described in the first embodiment. Thus, in the automatic high beam control, the luminescence of each of the LEDs 200 is not independently controlled, but rather all of the LEDs 200 are simultaneously/collectively turned on/off.

When the execution of the adaptive high beam control is selected using the adaptive high beam control selection switch, the lighting ECU 110 executes the adaptive high beam control. When the lighting ECU 110 executes the adaptive high beam control, the lighting ECU 110 controls the light distribution of the high beam lamp 122 based on the vehicle speed detected by the vehicle speed sensor 40 and the information (e.g., the other vehicle information and the brightness information) transmitted from the camera device 30.

While the headlamp 120 is on, the low beam lamp 121 is always on. In the adaptive high beam control, the luminescence (the amount of light) from each of the LEDs 200 forming the high beam lamp 122 is independently/separately controlled.

In the adaptive high beam control, a high beam condition is satisfied when all of the following conditions are satisfied.

The vehicle speed is equal to or higher than a predetermined vehicle speed threshold (i.e., second speed threshold, e.g., 15 km/h).

The brightness of the area in front of the host vehicle is less than a predetermined (second) reference brightness (in other words, the area is determined to be dark).

When the high beam condition is satisfied, the lighting ECU 110 basically sets the light distribution pattern to the high beam pattern. The lighting ECU 110, however, sets the light distribution pattern to a pattern wherein the high beam is darkened, in response to (based on) the state of the area ahead of the host vehicle. In other words, an intermediate light distribution pattern between the high beam pattern and the low beam pattern is obtained/implemented depending on the state of the area ahead of the host vehicle. When the high beam condition is not satisfied, the lighting ECU 10 sets the light distribution pattern to the low beam pattern, and turns off the high beam lamp 122.

When the high beam condition is satisfied, the lighting ECU 110 controls the luminescence (the amount of light) of each of the LEDs 200 based on the state of the area ahead of the host vehicle, the states being detected by the camera device 30. For instance, when the other vehicle with its lights on (the preceding vehicle with its lights on and/or the oncoming vehicle with its lights on) has been detected through the camera device 30, the lighting ECU 110 turns off one or more of the LEDs 200 that otherwise illuminate the area where that other vehicle with its lights on is present. Accordingly, the area where that other vehicle with its lights on is present is not illuminated.

Figure 5:
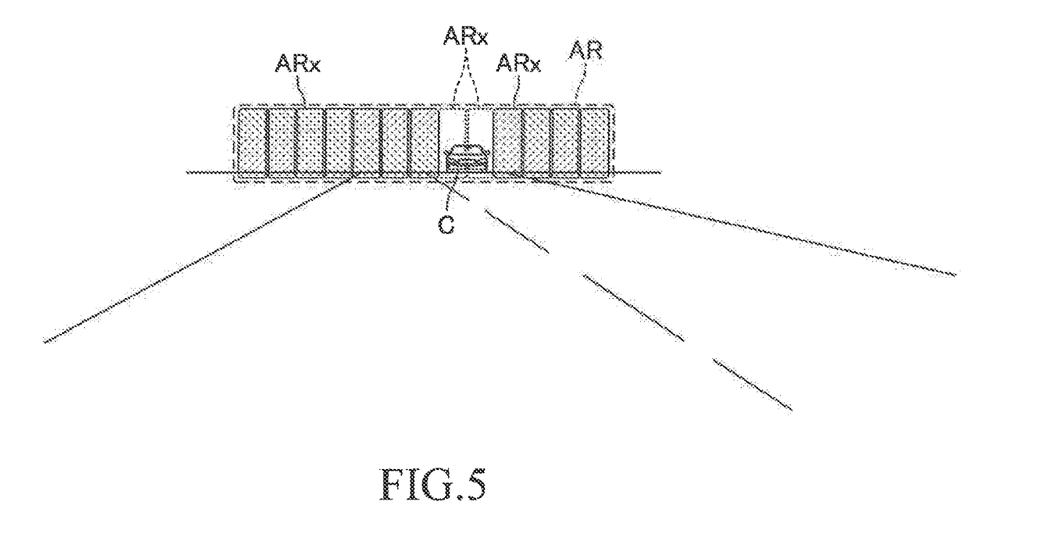
FIG. 5 is an illustrative drawing showing an illumination range of a high beam.

For instance, as shown in FIG. 5, the entire illumination area AR of the high beam lamp 122 is divided in to a plurality of areas ARx (the number of the LEDs 200) in the host vehicle width direction (or a left-right direction, a lateral direction). Each of the areas ARx is referred to as a high beam divided area ARx and corresponds to each of the LEDs 200. In other words, an irradiance of an arbitrary high beam divided area ARx can be controlled.

When the oncoming vehicle C with its lights on has been detected, the lighting ECU 110 turns off only the LED(s) that is(are) assigned to (corresponding to) the area where the vehicle C is present. This can prevent a driver of the vehicle C from being dazzled. It should be noted that, instead of turning off the LED assigned to the area where the vehicle C is present, the lighting ECU 110 may decrease the luminescence of (the amount of light radiated from) that LED.

It should also be noted that, even when the above described high beam condition is satisfied, the lighting ECU 110 switches the light distribution pattern to the low beam pattern, if, for example, the number of the other vehicles with theft lights on is greater than a predetermined number.

The specific area light distribution adjusting control of the second embodiment will next be described. The specific area light distribution adjusting control of the second embodiment is a control to maintain the light distribution pattern at the darkened high beam pattern regardless of the states ahead of the host vehicle by terminating (in place of) the adaptive high beam control in a period where it is determined/inferred that the host vehicle is traveling in the specific area, after it is determined/inferred that the host vehicle has started traveling in the specific area while the adaptive high beam control has been being executed.

The darkened high beam pattern means a light distribution wherein the luminescence of the high beam lamp 122 (the amount of light radiated from the high beam lamp 122) is decreased from the luminescence of the high beam lamp 122 of when the light distribution pattern is set to the high beam pattern (that is, the normal amount of light radiated from the high beam lamp 122) to a predetermined decreased luminescence. For instance, in the adaptive high beam control, the current flowing through each of the LEDs 200 is controlled (or set to a normal value) in such a manner that the high beam lamp 122 radiates the normal amount of light (hereinafter, referred to as the "standard high beam light amount"), when the high beam condition is satisfied and the other vehicle with its lights on is not detected. Whereas, when the light distribution pattern is set at the darkened high beam pattern, the current flowing through each of the LEDs 200 is controlled (or set/decreased to a value smaller than the normal value but larger than zero) in such a manner that the high beam lamp 122 radiates a set reduced amount of light that is smaller than the standard high beam light amount. For example, the set reduced amount of light is equal to a product of the standard high beam light amount and a coefficient (reducing light coefficient) that is smaller than "1" and is larger than "0".

The set reduced amount of light is set at a constant amount of light regardless of the state of the area ahead of the host vehicle. The set reduced amount of light has been set at the amount that is appropriate for the urban area and the residential area, and that can prevent the driver of the other vehicle ahead of the host vehicle from being dazzled. It should be noted that the amount of light of the high beam lamp 122 is decreased by darkening the entire illumination area of the high beam lamp 122. Furthermore, the set reduced amount of light may be zero. In this context, the darkened high beam pattern may be either the intermediate light distribution pattern between "the high beam pattern and the low beam pattern" or "the low beam pattern".

Figure 6:
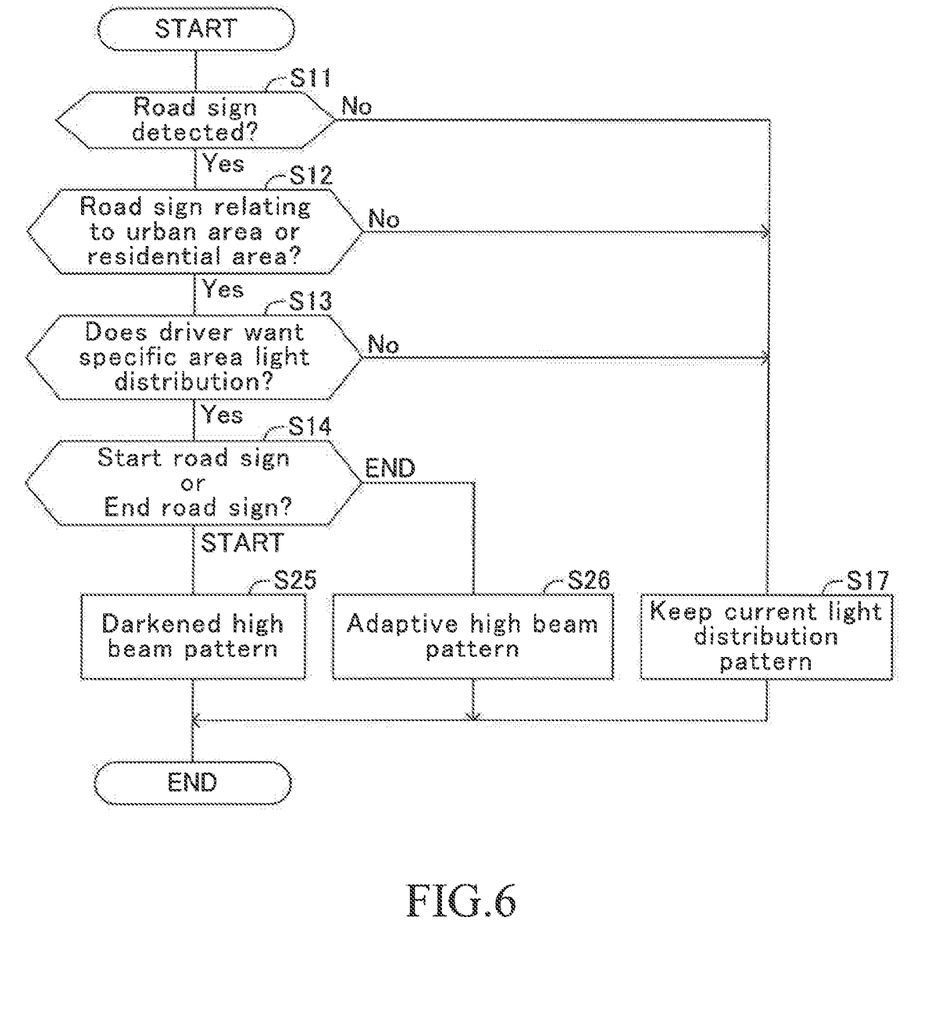
FIG. 6 is a flowchart representing a specific area light distribution adjusting (switching) control routine according to the second embodiment.

FIG. 6 shows a flowchart representing a specific area light distribution adjusting control routine of the second embodiment. The lighting ECU 110 is configured to execute the specific area light distribution adjusting control routine every time a predetermined time elapses. Hereinafter, this specific area light distribution adjusting control routine may also be referred to as an adjusting control routine (or switching control routine).

This adjusting control routine of the second embodiment is different from the adjusting control routine (FIG. 3) of the first embodiment only in that the step S15 shown in Fla 3 is replaced with step S25, and the step 16 shown in Fla 3 is replaced with step S26. It should be noted that steps that are the same as the steps shown in FIG. 3 are given reference symbols of the steps of the first embodiment, and the descriptions thereof may be omitted.

When the lighting ECU 110 determines that the detected road sign is the start point road sign at step S14, the lighting ECU 110 proceeds to step S25 so as to set the light distribution pattern to the darkened high beam pattern.

In this manner, when the host vehicle enters the urban area or the residential area, the light distribution pattern is switched to the darkened high beam pattern. This can provide the light distribution pattern that is appropriate to the urban area or the residential area.

When the lighting ECU 110 determines that the end point road sign is detected at step S14 while the lighting ECU 110 is repeating the adjusting control routine every time the predetermined time elapses, the lighting ECU 110 proceeds to step S26. At step S26, the lighting ECU 110 switches the light distribution pattern to a light distribution pattern (adaptive high beam pattern) according to the adaptive high beam control. Therefore, when the host vehicle leaves (gets out of) the urban area or the residential area, the radiation according to the darkened high beam pattern is ended, and the adaptive high beam control is started (restarted).

The thus configured vehicle lighting apparatus 2 of the second embodiment can achieve the same effect as the vehicle lighting apparatus 1 of the first embodiment. Furthermore, since the high beam lamp 122 is capable of controlling the amount of light (luminescence), the amount of light that is more appropriate to the urban area or the residential area can be obtained.

Modified Example of the Second Embodiment

In the second embodiment described above, the light distribution pattern set at step S25 is the darkened high beam pattern that does not change depending on the state ahead of the host vehicle. However, the light distribution pattern set at step S25 may be a light distribution pattern that changes depending on the state ahead of the host vehicle while the light amount radiated from the high beam lamp 122 is kept equal to or smaller than the set reduced amount of light. For example, the lighting ECU 110 sets the light distribution pattern to the darkened high beam pattern, basically, but further changes/adjusts the light distribution pattern depending on the state ahead of the host vehicle, while the host vehicle is traveling in the specific area (the unban area or the residential area). That is, the lighting ECU 110 reduces the amount of light radiated from one or some of the LEDs 200 from the amount of when that each of the LEDs radiates when the lighting ECU 110 sets the light distribution pattern to the darkened high beam pattern.

More specifically, the lighting ECU 110 sets the light distribution pattern to the above described darkened high beam pattern, when the other vehicle with its lights on is not detected ahead of the host vehicle while the host vehicle is traveling in the specific area.

Whereas, when the other vehicle with its lights on is detected ahead of the host vehicle while the host vehicle is traveling in the specific area, the lighting ECU 110 further decreases only the current flowing through the LED(s) 200 that is assigned to (corresponds to) the area where the other vehicle with its lights on is present so as to reduce the amount of light radiated from that LED 200. In other words, the lighting ECU 110 employs the darkened high beam pattern as a standard light distribution pattern, and further controls the light distribution of the high beam lamp 122 in response to the state ahead of the host vehicle in such a manner that the amount of light from one of the appropriate LEDs is reduced with respect to the amount of light from that one of the appropriate LEDs under the standard light distribution pattern. In this case, the total amount of light obtained when the light distribution pattern is set at the darkened high beam pattern that serves as the standard light distribution pattern may be an amount that is appropriate to the urban area and the residential area, but is not necessarily an amount that is determined in consideration of the presence of other vehicle. Therefore, the total amount of light obtained when the light distribution pattern is set at the darkened high beam pattern (i.e., the standard light distribution pattern) may be greater than the set reduced amount of light used in the above described second embodiment.

Hereinafter, the above described light distribution control may be referred to as a darkened adaptive high beam control, and the light distribution pattern obtained by the darkened adaptive high beam control may be referred to as a darkened adaptive high beam pattern.

Figure 7:
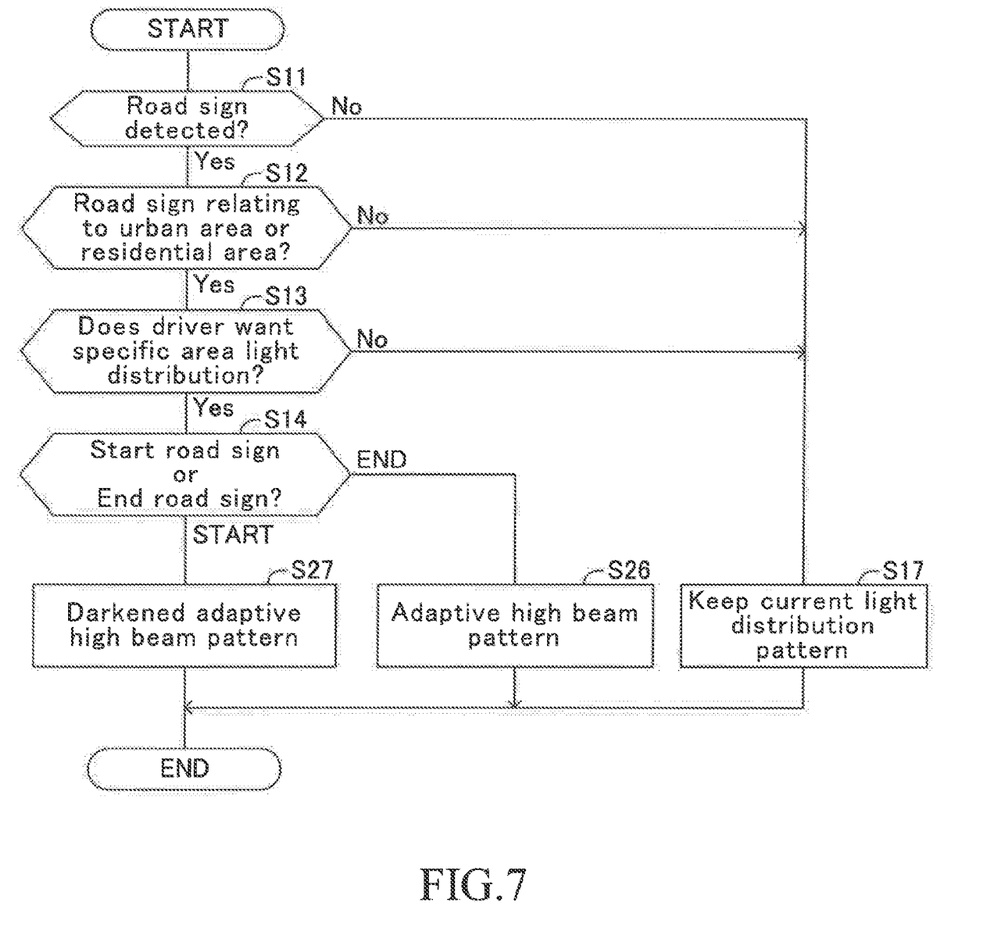
FIG. 7 is a flowchart representing a specific area light distribution adjusting (switching) control routine according to a modification of the second embodiment.

FIG. 7 shows a flowchart representing a specific area light distribution adjusting control routine of the modified example of the second embodiment. The lighting ECU 110 is configured to execute the specific area light distribution adjusting control routine every time a predetermined time elapses. Hereinafter, this specific area light distribution adjusting control routine may also simply be referred to as an adjusting control routine (or switching control routine).

This adjusting control routine of the modified embodiment is different from the adjusting control routine (FIG. 6) of the second embodiment only in that the step S25 shown in FIG. 6 is replaced with step S27. It should be noted that steps that are the same as the steps shown in FIG. 6 are given reference symbols of the steps of the second embodiment, and the descriptions thereof may be omitted.

When the lighting ECU 110 determines that the detected road sign is the start point road sign at step S14, the lighting ECU 110 proceeds to step S27 so as to perform the darkened adaptive high beam control.

Therefore, when the host vehicle enters the urban area or the residential area, the light distribution pattern is switched to the darkened adaptive high beam pattern. This can provide the light distribution pattern that is appropriate to the urban area or the residential area. Furthermore, when the other vehicle with its lights on is detected ahead of the host vehicle, the amount of light radiated toward the detected other vehicle is reduced.

When the lighting ECU 110 determines that the end point road sign is detected at step S14 while the lighting ECU 110 is repeating the adjusting control routine every time the predetermined time elapses, the lighting ECU 110 proceeds to step S26. At step S26, the lighting ECU 110 switches the light distribution pattern to the light distribution pattern (adaptive high beam pattern) according to the adaptive high beam control. Therefore, when the host vehicle leaves (gets out of) the urban area or the residential area, the radiation according to the darkened adaptive high beam pattern/control is ended, and the adaptive high beam control is started (restarted).

The thus configured vehicle lighting apparatus 2 of the modified example of the second embodiment can achieve the same effect as the vehicle lighting apparatus 2 of the second embodiment. Furthermore, since the light distribution pattern is varied in response to the state ahead of the host vehicle, the light distribution pattern can be much more appropriate.

The vehicle lighting apparatuses of the embodiments according to the present disclosure have been described. The present disclosure is not limited to the above embodiments, and various modifications may be employed without departing from the present disclosure.

For instance, the current flowing through each of the LEDs 200 is adjusted/varied to control the light distribution pattern, in the second embodiment. Alternatively, a movable shielding member may be attached to the high beam lamp, and the light distribution pattern may be controlled by shading/blocking the light radiated from the high beam lamp using the movable shielding member.

Furthermore, for instance, the specific areas are not limited to the urban area and the residential area, and may be any appropriate area. In addition, the specific areas may be either one of the urban area and the residential area.

What is claimed is:

1. A vehicle lighting apparatus comprising:
    a lamp unit configured to radiate light in a forward direction of a host vehicle;
    a camera device configured to take a picture of a scene in front of said host vehicle; and
    a control unit configured to control distribution of light radiated from said lamp unit,
    wherein,
    said control unit is
        obtaining road sign information on a road sign posted ahead of said host vehicle based on said picture taken by said camera device;
        based on the obtained road sign information, determining whether said road sign represents a start point of a specific area, and determining whether said road sign represents an end point of said specific area;
        determining whether said host vehicle is traveling in said specific area based on whether said road sign information indicates the start point or the end point of said specific area; and
        in a period in which it is determined that said host vehicle is not traveling in said specific area, performing an adaptive high beam control that is a control to switch said distribution of light between a pattern corresponding to a high beam and a pattern corresponding to a modified high beam in which the high beam is illuminated without illuminating a preceding vehicle or an oncoming vehicle, in response to a state of an area ahead of said host vehicle obtained based on said picture taken by said camera device; and
        in a period in which it is determined that said host vehicle is traveling in said specific area after said host vehicle starts traveling in said specific area while said adaptive high beam control is being executed, performing a modified darkened adaptive high beam control that is a control to switch said distribution of light between a standard light distribution pattern corresponding to a darkened high beam and a pattern corresponding to said standard light distribution pattern without illuminating a preceding vehicle or an oncoming vehicle, in response to said state of said area ahead of said host vehicle.

2. The vehicle lighting apparatus according to claim 1, wherein, said specific area is any one of an urban area and a residential area;
    and wherein,
        said control unit is configured to control said distribution of light radiated from said lamp unit in such a manner that said light distribution pattern by said lamp unit matches a pattern corresponding to low beam, or an intermediate light distribution pattern between a pattern corresponding to a high beam and said pattern corresponding to said low beam, in a period in which it is determined that said host vehicle is traveling in said specific area.

3. The vehicle lighting apparatus according to claim 2, wherein, said control unit is configured to:
- perform an automatic high beam control that is a control to automatically switch, in response to a state of an area ahead of said host vehicle, said light distribution pattern by said lamp unit between said pattern corresponding to said low beam and said pattern corresponding to said high beam; and
- maintain said light distribution pattern by said lamp unit at said pattern corresponding to said low beam regardless of said state of said area ahead of said host vehicle in place of said automatic high beam control, in a period in which it is determined that said host vehicle is traveling in said specific area after it is determined that said host vehicle starts traveling in said specific area while said automatic high beam control is being performed.

4. The vehicle lighting apparatus according to claim 2, wherein, said lamp unit is configured to be capable of darkening high beam obtained under said high beam pattern, and said control unit is configured to:
- perform the adaptive high beam control that further includes a control to darken said high beam obtained under said high beam pattern in response to a state of an area ahead of said host vehicle; and
- maintain said light distribution pattern by said lamp unit at either said pattern corresponding to said low beam, or an intermediate light distribution pattern between said pattern corresponding to said low beam and said pattern corresponding to said high beam regardless of said state of said area ahead of said host vehicle host vehicle in place of said adaptive high beam control, in a period in which it is determined that said host vehicle is traveling in said specific area after it is determined that said host vehicle starts traveling in said specific area while said adaptive high beam control is being performed.

5. The vehicle lighting apparatus according to claim 2, wherein, said lamp unit is configured to be capable of darkening high beam obtained under said high beam pattern, and said control unit is configured to:
- perform the adaptive high beam control that further includes a control to darken said high beam in response to a state of an area ahead of said host vehicle; and
- set said light distribution pattern by said lamp unit to an intermediate light distribution pattern as a standard light distribution pattern, said intermediate light distribution pattern being between said pattern corresponding to said low beam and said pattern corresponding to said high beam, and to darken high beam obtained under said standard light distribution pattern in response to said state of said area ahead of said host vehicle, in place of said adaptive high beam control, in a period in which it is determined that said host vehicle is traveling in said specific area after it is determined that said host vehicle starts traveling in said specific area while said adaptive high beam control is being performed.

6. The vehicle lighting apparatus according to claim 1, wherein said control unit is further configured to determine whether said road sign is a predetermined road sign that represents a start point of one of an urban area and a residential area as said specific area, and determine whether or not said road sign is a predetermined road sign that represents an end point of said one of the urban area and the residential area as said specific area.

* * * * *